United States Patent [19]

Proeschl

[11] 4,159,143
[45] Jun. 26, 1979

[54] TRUCK BODY CORNER JOINT
[75] Inventor: Bernard E. Proeschl, Decatur, Ill.
[73] Assignee: Caterpillar Tractor Co., Peoria, Ill.
[21] Appl. No.: 806,803
[22] Filed: Jun. 15, 1977
[51] Int. Cl.² .............................................. B62D 27/02
[52] U.S. Cl. ........................................ 296/29; 403/271
[58] Field of Search .................. 296/29; 403/271, 245, 403/231

[56] References Cited
U.S. PATENT DOCUMENTS

| 2,246,245 | 6/1941 | Eckart | 403/271 |
| 3,325,199 | 6/1967 | Cole | 403/271 |

FOREIGN PATENT DOCUMENTS

| 533425 | 11/1954 | Belgium | 403/271 |
| 370383 | 4/1932 | United Kingdom | 403/271 |

*Primary Examiner*—Philip Goodman
*Attorney, Agent, or Firm*—John L. James

[57] ABSTRACT

A corner joint is provided which includes a first assembly which has a protrusion and a second assembly which has a rib. The rib has a flange portion welded to a respective protrusion. The flange is positioned about the protrusion and movable along said protrusion to said weld position.

1 Claim, 3 Drawing Figures

U.S. Patent   Jun. 26, 1979   4,159,143
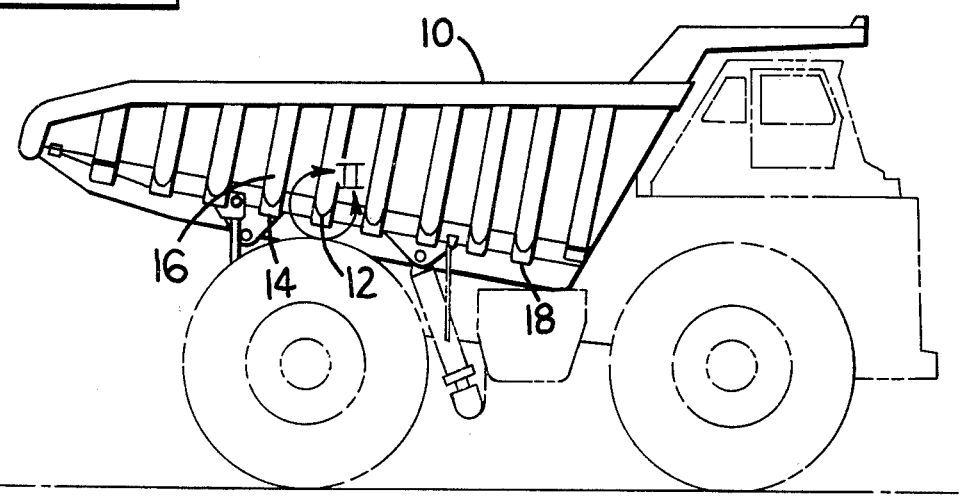
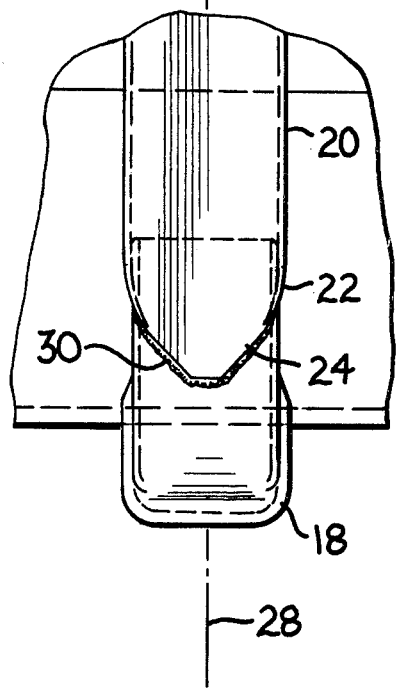
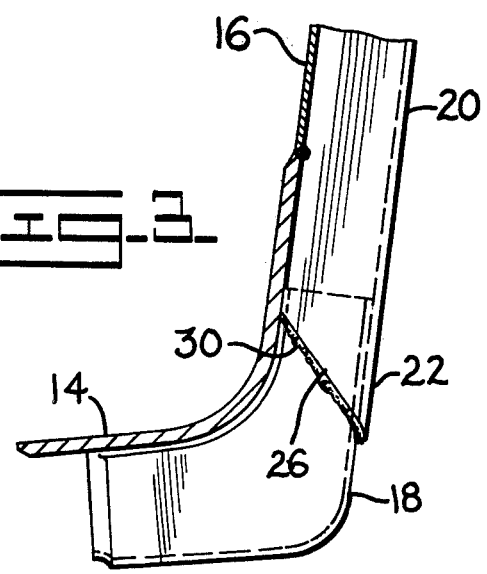

TRUCK BODY CORNER JOINT

BACKGROUND OF THE INVENTION

Large, high load capacity trucks, such as off-highway mining and material transporting trucks, have truck bodies which are assembled in sections. The sections are often welded together at or near their work location. Welding under field conditions does not always produce the best weld joint possible. Stress present in the truck body sometimes results in a rupture which propagates horizontally. Because horizontal welds are used to join the floor and sides of the truck body, a rupture can result in complete failure of the joint. It is desirable to have a corner joint which resists rupture and does not propagate a rupture.

SUMMARY OF THE INVENTION

The present invention is directed to overcoming one or more of the problems as set forth above.

According to the present invention, a corner joint comprises a first assembly having a protrusion extending substantially perpendicularly therefrom and a second assembly having a rib. The rib has a flange portion welded to a respective protrusion. The flange is positioned about the protrusion and movable along and in contact with the protrusion to the preselected weld position.

BRIEF DESCRIPTION OF THE DRAWINGS

FIG. 1 is a simplified side view of a truck;

FIG. 2 is an enlarged view of the encircled portion of FIG. 1; and

FIG. 3 is side view similar to FIG. 2.

DETAILED DESCRIPTION

Referring to FIG. 1, a truck body 10 has a corner joint 12 formed, for example, by the union of a first, floor assembly 14 and a second, side assembly 16. The floor assembly 14 includes a protrusion 18 which extends substantially perpendicularly from the floor assembly 14. There are preferably a plurality of protrusions 18 spaced about the periphery of the floor assembly 14.

Referring to FIGS. 2-3, the side assembly 16 includes a rib 20 which has a flange portion 22 welded to a respective protrusion 18 and forming the corner joint 12. The flange 22 is of a construction sufficient for being welded to the protrusion 18. The flange 22 preferably angularly extends from the rib 20 generally parallel to the protrusion 18 to a location overlapping the protrusion 18. The flange 22 is positioned about the protrusion 18 and movable along and in contact with the protrusion 18 to the preselected weld position.

The flange 22 preferably has front portion 24 of a general isosceles quadrilateral configuration and side portions 26 of a general right triangular configuration.

The rib 20 has a generally vertical axis 28. The flange 22 and protrusion 18 are welded at an angle other then substantially perpendicular to the axis 28 forming a weld which is generally not horizontal.

In operation, the flange 22 is welded to the protrusion 18 forming a generally non-horizontal weld 30, which does not propagate a rupture horizontally. The flange 22 is movable along and in contact with the protrusion 18 prior to welding which functions to compensate for manufacturing deviations.

Other aspects, objects and advantages will become apparent from a study of the specification, drawings and appended claims.

The embodiments of the invention in which an exclusive property or privilege is claimed as defined as follows:

1. A truck body corner joint for a truck body comprising:
   a floor assembly of said truck body having a protrusion extending substantially perpendicularly therefrom; and
   a side assembly of said truck body having a rib, said rib having a generally vertical axis and a flange portion having a preselected weld position overlapping said protrusion and extending from said rib generally parallel to said protrusion and being welded to said protrusion at an angle other than substantially perpendicular to said axis and forming a corner joint, said flange portion being of a construction sufficient for positioning about and substantially enclosing said protrusion and movable along and in contact with said protrusion to said preselected weld position.

* * * * *